No. 837,790. PATENTED DEC. 4, 1906.
W. E. BRYANT.
AUTOMATIC CHECKS FOR FEED GLASSES AND WATER BY-PASSES
FOR LUBRICATORS.
APPLICATION FILED MAR. 20, 1903.
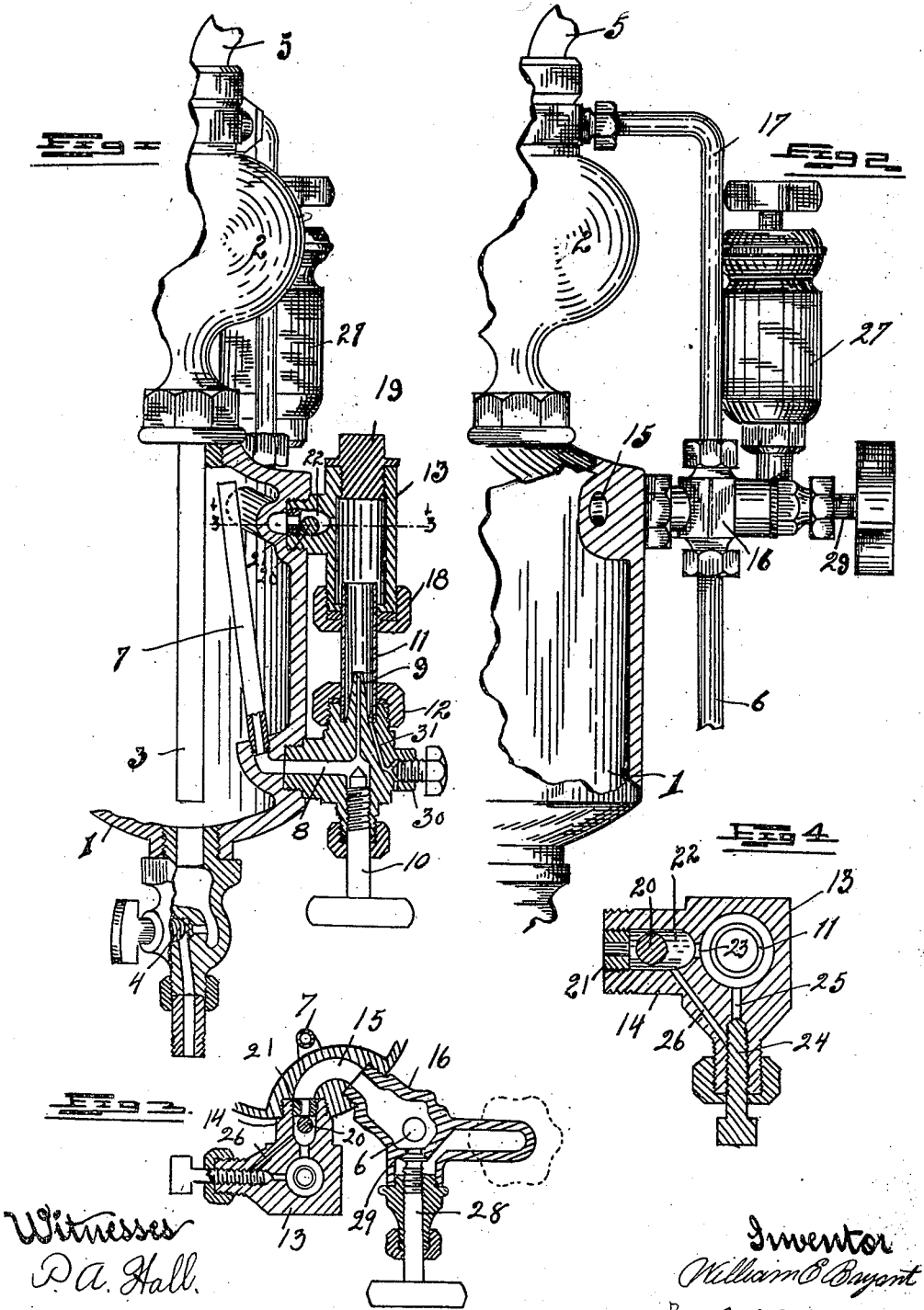

UNITED STATES PATENT OFFICE.

WILLIAM E. BRYANT, OF DETROIT, MICHIGAN, ASSIGNOR TO MICHIGAN LUBRICATOR CO., OF DETROIT, MICHIGAN, A CORPORATION.

AUTOMATIC CHECKS FOR FEED-GLASSES AND WATER BY-PASSES FOR LUBRICATORS.

No. 837,790.  Specification of Letters Patent.  Patented Dec. 4, 1906.

Application filed March 20, 1903. Serial No. 148,724.

*To all whom it may concern:*

Be it known that I, WILLIAM E. BRYANT, a citizen of the United States, residing at Detroit, in the county of Wayne, State of Michigan, have invented certain new and useful Improvements in Automatic Checks for Feed-Glasses and Water By-Passes for Lubricators; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to lubricators; and it consists in the construction and arrangement of parts, as hereinafter fully set forth, and pointed out particularly in the claim.

The objects of the invention are to provide means in connection with the sight-feed glass and oil-discharge arm of a double-connected lubricator whereby upon the breaking of the feed-glass the steam will automatically be cut off from the glands which hold said glass, enabling a new glass to be substituted for the one broken without closing the throttle or without interfering with the feed of the other glasses on the lubricator, at the same time providing for filling a new glass which is set in the place of the one broken with water of condensation drawn from the steam channel or passage which connects with the tallow-pipe, whereby a newly-set glass may be filled with water at the temperature of the other parts of the oil-cup.

The above objects are attained by the structure illustrated in the accompanying drawings, in which—

Figure 1 is a fragmentary view, partly in section, of a portion of an oil-cup, one of the sight-feed glasses mounted upon said cup having this invention applied thereto, and of a portion of the condenser connected with the steam-supply pipe. Fig. 2 is a fragmentary view, partly in section, showing the connection of the steam-pipe with the oil-discharge arm and the tallow-pipe leading to the steam-chest of the locomotive, not shown. Fig. 3 is a horizontal section through the top fitting of the sight-feed glass, a portion of the cup, and the connection leading to the tallow-pipe, as on line 3 3 of Fig. 1. Fig. 4 is an enlarged detail, in horizontal section, through the fitting which supports the upper end of the sight-feed glass in which the check-valve is located and in which the water by-pass is formed.

Referring to the characters of reference, 1 designates an oil-cup, which may be of any suitable construction and upon which is mounted the condenser 2, communicating with the oil-cup through the dependent tube 3, by means of which the water of condensation is deposited at the bottom of the cup, which is provided with the usual blow-out cock 4.

The condenser is connected with the boiler through the steam-pipe 5, and the discharge-arm of the lubricator is connected with the steam-chest through the tallow-pipe 6, as will be well understood.

As in all hydrostatic sight-feed lubricators, the oil displaced by the water of condensation which passes into the cup flows into the upper end of the oil-tube 7, which connects at its lower end with the oil passage-way 8, leading to and through the nozzle 9 and controlled by the valve 10. The lower end of the sight-feed glass 11 is secured over the nozzle by the gland 12. Screwed into the upper end of the cup is the fitting 13, having a short hollow stem 14, which communicates with the oil passage-way 15 in the lubricator that leads to the tallow-pipe 6 through the coupling 16, with which the tallow-pipe communicates.

Leading from the steam-pipe 5 is the steam-supply pipe 17, which also communicates with the coupling 16 and supplies boiler-pressure to the oil passage-way 15 and to the upper end of the sight-feed glass 11, which is secured in the coupling 13 by means of the gland 18. In the upper end of the coupling 13 is the removable screw-plug 19, which affords an opening when removed through which the glass may be introduced when setting it in place. Within the hollow stem 14 of the coupling 13 is the ball-valve 20, which is confined therein by a hollow screw-plug 21. Leading from the valve-chamber 22 is a reduced opening 23, which communicates with the upper end of the glass and over which said valve is adapted to seat automatically upon the breaking of said glass, being actuated by the force of the steam-pressure within the passage-way 15, which is ordinarily balanced by the pressure within the cup, but which balance is disturbed when the glass becomes broken, causing said valve to seat forcibly over the opening 23 and preventing the escape of steam, thereby obviating the liability of scalding the engineer and enabling the plug 19 to be removed and a new glass readily inserted in the place of the one broken by first closing the oil-valve 10 and without interfering in any way with the feeding of the other glasses which may be mounted upon the oil-cup, as is common in locomotive-lubricators.

When the glass has been inserted and secured by the glands 12 and 18, it may be filled with water by opening the screw-valve 24, which normally closes the channel 25, leading from said valve into the coupling 13 above the glass, permitting water to flow through the water by-pass 26, which leads from the valve-chamber 22 to the valve 24 and which affords a passage for the water of condensation which forms in said valve-chamber around the valve 20 when on its seat into the glass. After the glass has been filled the valve 24 is closed and the oil-valve 10 is opened, when the pressure at the opposite ends of the glass will be equalized and the ball 20 will roll from its seat, placing the feed-glass in operation as before.

It will now be understood that upon the breaking of the sight-feed glass the escape of steam is immediately and automatically prevented by a valve so located as to enable a new glass to be inserted at once without interfering with any of the feeds on the lubricator except the one where the glass is broken, and the delay at the broken glass need be only momentary owing to the readiness with which a new glass may be inserted.

To provide for supplying lubricant to the tallow-pipe by means other than the sight-feed glass illustrated herein a hand-oiler 27 is employed, the cup of which is controlled by a valve 28, which closes a passage 29, leading to the tallow-pipe, and by means of which oil may be supplied by hand whenever necessary or where it is desired to supply an additional quantity of oil to the cylinder without disturbing the feed of the cup.

The small valve 30 controls a passage 31, leading from the glass, through which the glass may be drained when desired.

Having thus fully set forth my invention, what I claim as new, and desire to secure by Letters Patent, is—

In a lubricator, the combination with the oil-cup, of the oil-delivery arm connected with the tallow-pipe and with a source of steam under pressure, the sight-feed glass communicating with the oil-delivery arm, a valve in the passage leading from the sight-feed glass adapted to automatically close said passage upon the breaking of the glass, there being a valve-controlled water by-pass around said valve, connecting the top of the glass with said delivery-arm.

In testimony whereof I sign this specification in the presence of two witnesses.

WILLIAM E. BRYANT.

Witnesses:
 E. S. WHEELER,
 P. A. HALL.